United States Patent
Holzman et al.

(10) Patent No.: US 7,606,918 B2
(45) Date of Patent: Oct. 20, 2009

(54) ACCOUNT CREATION VIA A MOBILE DEVICE

(75) Inventors: Aron M. Holzman, Bellevue, WA (US); Raja Pazhanivel Perumal, Kirkland, WA (US); Michael Shayne Agney, Issaquah, WA (US); Vikas Khandelwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 10/850,010

(22) Filed: May 20, 2004

(65) Prior Publication Data

US 2005/0239447 A1     Oct. 27, 2005

Related U.S. Application Data

(60) Provisional application No. 60/565,652, filed on Apr. 27, 2004.

(51) Int. Cl.
*G06F 15/16* (2006.01)
(52) U.S. Cl. .................. 709/229; 709/206; 709/207
(58) Field of Classification Search ............ 709/229, 709/206, 207
See application file for complete search history.

(56) References Cited

U.S. PATENT DOCUMENTS

| | | | |
|---|---|---|---|
| 5,491,749 A | 2/1996 | Rogaway | |
| 6,195,698 B1 | 2/2001 | Lillibridge et al. | |
| 6,633,311 B1 | 10/2003 | Douvikas et al. | |
| 6,691,158 B1 | 2/2004 | Douvikas et al. | |
| 7,142,840 B1 * | 11/2006 | Geddes et al. | 455/411 |
| 7,257,391 B2 * | 8/2007 | Burgess et al. | 455/414.1 |
| 2002/0068554 A1 * | 6/2002 | Dusse | 455/419 |
| 2002/0129282 A1 * | 9/2002 | Hopkins | 713/201 |
| 2002/0178122 A1 | 11/2002 | Maes | |
| 2003/0012382 A1 * | 1/2003 | Ferchichi et al. | 380/270 |
| 2003/0065934 A1 * | 4/2003 | Angelo et al. | 713/200 |
| 2003/0191721 A1 | 10/2003 | Fiammante | |
| 2004/0068631 A1 * | 4/2004 | Ukeda et al. | 711/163 |
| 2004/0127232 A1 * | 7/2004 | Kotzin | 455/456.6 |
| 2004/0199474 A1 * | 10/2004 | Ritter | 705/65 |

(Continued)

OTHER PUBLICATIONS

Matsumoto, "Human-Computer Cryptography: an Attempt," Proceedings of the 3rd ACM Conference on Computer and Communications Security, 1996, pp. 68-75, ACM Press, New York, USA.

(Continued)

*Primary Examiner*—Hassan Phillips
*Assistant Examiner*—Alan S Chou
(74) *Attorney, Agent, or Firm*—Senniger Powers

(57) ABSTRACT

Creating an account via a mobile device. A request to create an account is received from a user via a mobile device. The request is received from the mobile device according to a wireless communications protocol. In response to the received request, a confirmation message is delivered to the mobile device for rendering to the user as a challenge. A response to the rendered challenge is received from the user via the mobile device. It is determined if the received response to the rendered challenge corresponds to the delivered confirmation message. And the account is created for the user if the received response to the rendered challenge is determined to correspond to the delivered confirmation message. Other aspects of the invention are directed to computer-readable media for use with account creation via a mobile device.

40 Claims, 7 Drawing Sheets

U.S. PATENT DOCUMENTS

2004/0230489 A1* 11/2004 Goldthwaite et al. .......... 705/26
2006/0206709 A1* 9/2006 Labrou et al. ............... 713/167
2007/0178899 A1* 8/2007 Kuhn ...................... 455/435.1

OTHER PUBLICATIONS

Ahn et al., Telling Humans and Computers Apart Automatically, Communications of the ACM, Feb. 2004, pp. 57-60, vol. 47, Issue 2, ACM Press, New York, USA.

Rui et al., "Excuse Me, But Are You Human?," Proceedings of the Eleventh ACM International Conference on Multimedia, 2003, pp. 462-463, ACM Press, New York, USA.

Harbitter et al., "The Performance of Public Key-Enabled Kerberos Authentication in Mobile Computing Applications," Proceedings of the 8th ACM Conference on Computer and Communications Security, 2001, pp. 78-85, ACM Press, New York, USA.

Shih et al., "A Service Management Framework for M-Commerce Applications," Mobile Networks and Applications, Jun. 2002, pp. 199-212, vol. 7, Issue 3, Kluwer Academic Publishers, Hingham, MA, USA.

Pinkas et al., "Securing Passwords Against Dictionary Attacks," Proceedings of the 9th ACM Conference on Computer and Communications Security, 2002, pp. 161-170, ACM Press, New York, USA.

Hobaugh, "AI Update," Intelligence, Winter 2001, pp. 6-13, vol. 12, Issue 4, ACM Press, New York, USA.

Masood, "15 Seconds: Fighting Sambots with .Net and AI," Online, Feb. 2, 2004, printed from http://www.internet.com/icom_cgi/print/print/cgi?url=http://www.15seconds.com/issue/040202.htm, 16 pages.

Baird et al., "Human Interactive Proofs and Document Image Analysis," Proceedings of the 5th IAPR International Workshop on Document Analysis Systems, Aug. 2002, 7 pages, Princeton, NJ, U.S.A.

Samar, "Single Sign-On Using Cookies for Web Applications," Enabling Technologies: Infrastructure for Collaborative Enterprises Proceedings, IEEE 8th International Workshops, Jun. 16, 1999, pp. 158-163.

Baird et al., "Human Interactive Proofs and Document Image Analysis", Springer-Verlag Berlin Heidelberg 2002; DAS 2002, LNCS 2423, pp. 507-518.

Chew et al., "Baffle Text: a Human Interactive Proof", Published in Proceedings of the SPIE/IS&T Document Recognition & Retrieval Conf. X, Santa Clara, CA, Jan. 22-23, 2003, 11 pgs.

Coates et al., "Pessimal Print: A Reverse Turing Test", IEEE 2001, pp. 1154-1158.

* cited by examiner

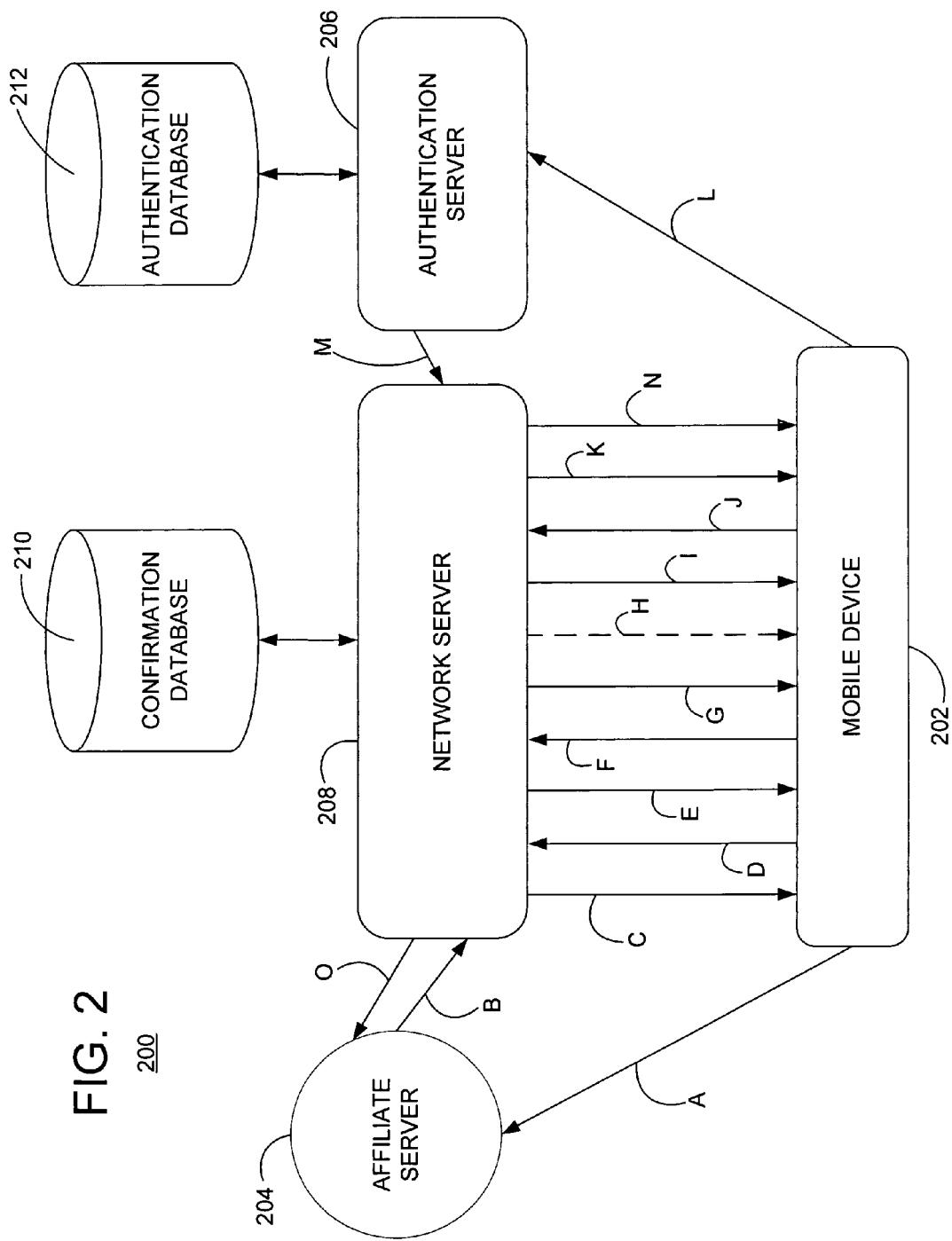

ACCOUNT CREATION VIA A MOBILE DEVICE

TECHNICAL FIELD

Embodiments of the present invention relate to the field of computer network environments. In particular, embodiments of the invention relate to creating an account from a mobile device and to preventing automated scripts from running tasks to create an account via a mobile device in such computer network environments.

BACKGROUND OF THE INVENTION

Web sites, or Internet sites, often provide information, products, services, and the like to their users. Many web sites desire a user to "register" before their web servers will grant access to the user. During registration, a user typically supplies personal information such as username, account number, address, telephone number, e-mail address, computer platform, age, gender, and/or hobbies to the registering web site.

When registering a user for the first time, a web site may request that the user select a login identifier, or login ID, and an associated password. The login ID allows the web site to identify the user and retrieve information about the user during subsequent user visits to the web site. Generally, the login ID is unique to the web site such that no two users have the same login ID. The combination of the login ID and password associated with the login ID allows the web site to authenticate the user during subsequent visits to the web site. The password also prevents others (who do not know the password) from accessing the web site using the user's login ID. Many users access the Internet via mobile devices. But currently, before such users are allowed to access the Internet via their mobile devices, they often need to register their accounts via conventional desktop or laptop personal computers (PCs).

Moreover, scripting (e.g., an automated bot) permits a malicious user to emulate human interaction with a web site for registering a large number of new accounts associated with fictitious users. Such automated script registrations may have several undesirable consequences. For example, because many electronic mail (or e-mail) services allow users to filter out unsolicited mass mailings (i.e., spam) based on the sender's address, running scripts to register new e-mail accounts enables the malicious user to continue sending spam from the new accounts in the face of such filtering. Among other things, the new accounts also provide readily accessible space for storing illegal copies of software.

Several conventional techniques have been designed to prevent automated script registrations. For example, the concept of "Turing tests" for interrogating two unseen respondents, a human and a computer, has been developed to determine which of the two is the computer. Completely Automated Public Turing test to tell Computers and Humans Apart (CAPTCHA) is a well-known project that creates puzzles designed to be solvable by humans but not by computers for distinguishing humans and computers over a network. Typically, the puzzles involve having the user read a sequence of characters from a visually cluttered image. Further information on CAPTCHA is available at www.captcha.net.

Preventing automated script registrations via a mobile device such as a portable phone or a personal digital assistant (PDA) presents another challenge. Presently, implementations of the conventional CAPTCHAs or HIPs are limited to PCs. This is because a mobile device typically does not have sufficient screen resolution, graphics capability, audio capability, or memory to successfully implement a CAPTCHA or HIP based on image or audio recognition. Moreover, the transmission channel to a mobile device typically does not have sufficient network bandwidth and/or speed to effectively transmit a traditional CAPTCHA or HIP to the mobile device.

In light of the foregoing, a solution is desired to effectively allow a user to create an account via a mobile device without permitting automated scripts to run a repetitive task that is supposed to be performed by a human.

SUMMARY OF THE INVENTION

Embodiments of the invention overcome one or more deficiencies in the prior art by providing, among other things, creation of a legitimate account via a mobile device. According to one embodiment, the invention provides a network server to receive a request to create an account via a mobile device (e.g., a wireless device such as a portable phone or a PDA). In this embodiment, the network server delivers a confirmation message to the mobile device after receiving the request. According to one or more embodiments of the invention, the delivered confirmation message is rendered to a user of the mobile device as a secure challenge and may be in the form of a six-digit numeric Short Message Service (SMS) message or a Wireless Application Protocol (WAP) push message. The user may then send a response to the rendered challenge to the network server. In another embodiment of the invention, the network server allows the user to continue the account registration process (e.g., entering user profile information such as a desired username, password, etc.) if it verifies that the response to the rendered challenge corresponds to the delivered confirmation message. An authentication server then creates an account for the user if the user successfully completes the account registration process.

In an embodiment of the invention, the authentication server keeps track of a number of accounts created from the given mobile device (e.g., as identified by a device identifier (or device ID) and/or a provider identifier (or provider ID) associated with the mobile device) to prevent the user from creating more than a predetermined number of accounts from that mobile device within a predefined period. Moreover, the authentication server maintains a blacklist of successful responses to prevent a malicious user from replaying a response to the challenge to the authentication server (i.e., bypassing the network server or resource domain).

In another embodiment of the invention, if the user fails to provide a successful response to the rendered challenge, the network server inquires if the user desires to receive another confirmation message. If the user indicates a desire to receive another confirmation, the network server then delivers a new confirmation message to the mobile device for rendering to the user as another challenge. But to prevent automated scripts from creating one or more accounts via the mobile device, embodiments of the invention limit the number of times that such a new confirmation message may be delivered to the mobile device within a predefined period. One or more other embodiments of the invention further limit the number of times that the user may try to respond to a delivered confirmation message within a predefined period.

Briefly described, a method employing aspects of the invention creates an account via a mobile device. The method includes receiving, via a mobile device, a request from a user to create an account. The request is received from the mobile device according to a wireless communications protocol. The method also includes delivering, in response to the received request, a confirmation message to the mobile device for rendering to the user as a challenge. The method also includes receiving a response to the rendered challenge from the user via the mobile device. The method further includes determining if the received response to the rendered challenge corresponds to the delivered confirmation message. Moreover, the method includes creating the account for the user if the received response to the rendered challenge is determined to correspond to the delivered confirmation message.

In another embodiment of the invention, a system employing aspects of the invention creates an account via a mobile device. The system includes a network server for receiving a request from a user to create an account via a mobile device. The network server receives the request from the mobile device according to a wireless communications protocol. In response to the received request, the network server is configured to deliver a confirmation message to the mobile device for rendering to the user as a challenge. The network server is further configured to receive a response to the rendered challenge from the user via the mobile device and to determine if the received response to the rendered challenge corresponds to the delivered confirmation message. The system also includes an authentication server for creating the account for the user if the network server determines that the received response to the rendered challenge corresponds to the delivered confirmation message.

In yet another embodiment of the invention, computer-readable media employing aspects of the invention have stored thereon a data structure for creating an account via a mobile device. The data structure includes a device identifier field for storing a device identifier. The device identifier identifies a mobile device of a user. The data structure also includes a provider identifier field for storing a provider identifier. The provider identifier identifies a service provider that offers a service to the user via the mobile device. The data structure also includes a confirmation message field for storing a confirmation message delivered to the mobile device for rendering to the user as a challenge. The data structure includes a message counter field for storing a number of times that the stored confirmation message is delivered to the mobile device. Furthermore, the data structure includes a response counter field for storing a number of times that a response to the rendered challenge is received from the user.

In further yet another embodiment of the invention, computer-readable media employing aspects of the invention have computer-executable components for creating an account via a mobile device. The computer-readable media include an interface component to receive a request to create an account from a user. The user requests to create the account via a mobile device. The interface component receives the request from the mobile device according to a wireless communications protocol. The computer-readable media also include a confirmation component to transmit a confirmation message to the mobile device in response to the received request. The confirmation component transmits the confirmation message to the mobile device for rendering to the user as a challenge. The computer-readable media further include a verification component to receive a response to the rendered challenge from the user via the mobile device and to determine if the received response to the rendered challenge corresponds to the transmitted confirmation message. The computer-readable media also include an account component to create the account for the user if the received response to the rendered challenge is determined to correspond to the transmitted confirmation message.

Computer-readable media having computer-executable instructions for performing methods of creating an account via a mobile device embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIG. 2 is a block diagram illustrating an exemplary interaction between a mobile device, an affiliate server, a network server, and an authentication server.

Corresponding reference characters indicate corresponding parts throughout the drawings.

DETAILED DESCRIPTION OF THE INVENTION

Exemplary Network Environment

Figure 1:
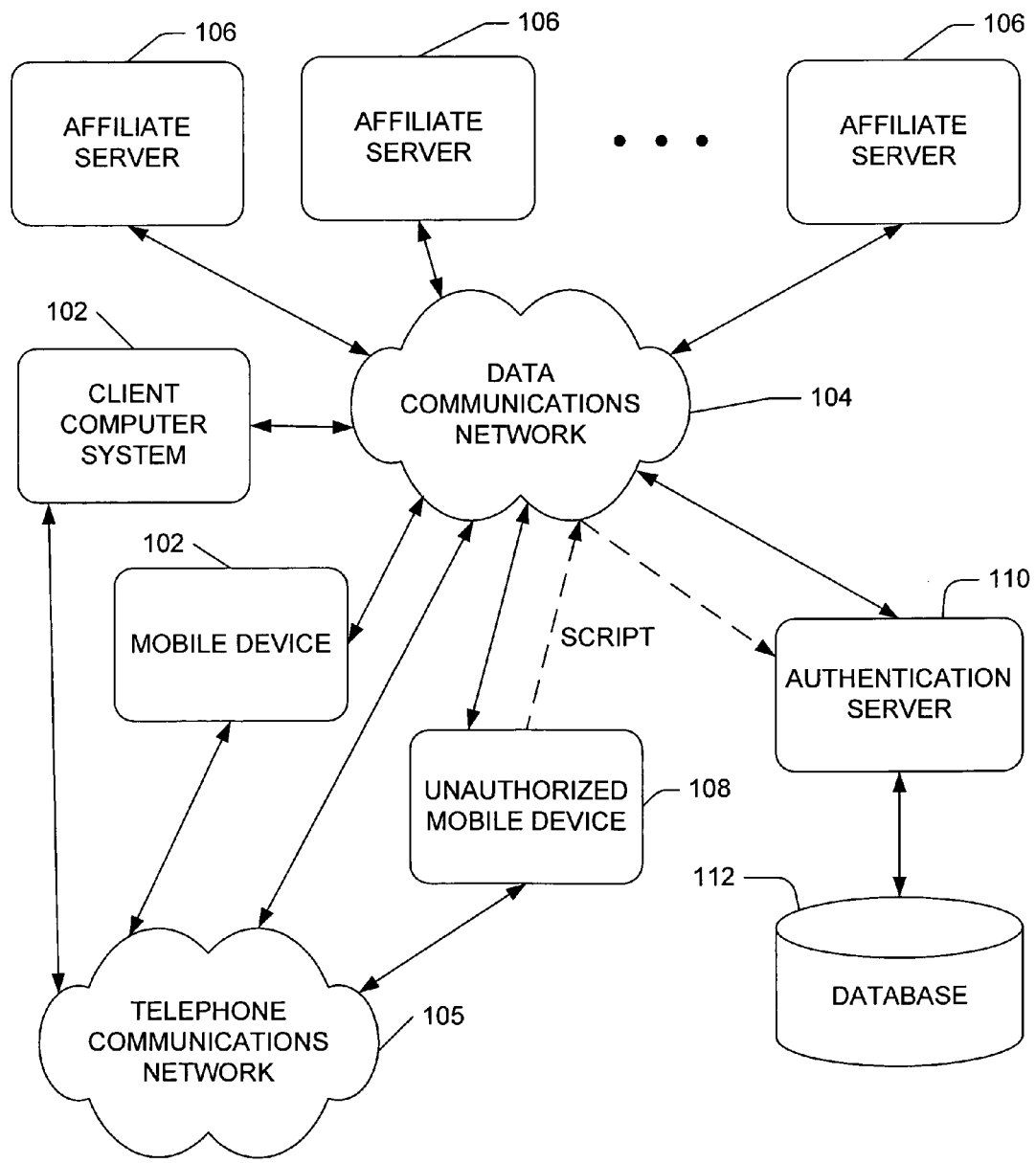
FIG. 1 is a block diagram illustrating an exemplary network environment in which embodiments of the present invention may be utilized.

Referring now to the drawings, FIG. 1 generally illustrates an exemplary network environment in which the present invention may be utilized to prevent automated scripts (or bots) from registering or creating a large number of accounts via a mobile device. In this instance, FIG. 1 diagrammatically shows cross-network collaboration between web sites as part of a distributed, multi-site user authentication system. Such services provide a user with the ability to access one or more participating web sites or resources with a single sign-in. Although the participating sites (referred to as "affiliates" or "affiliate sites") maintain control over permissions, they use the authentication service rather than hosting and maintaining their own proprietary authentication systems. In the example of FIG. 1, embodiments of the invention are described in the context of preventing automated script registrations with a multi-site user authentication system. It is to be understood, however, that the invention is applicable in any environment in which a user seeks access to a server and is operable with any type and number of authentication systems.

One or more client computer systems 102, which may include a mobile device, are coupled directly to a data communications network 104 in FIG. 1. Alternatively, the client computer systems 102 are connected to the network 104 via a telephone communications network 105 (e.g., for wireless telephone services). In this example, network 104 is the Internet (or the World Wide Web). However, embodiments of the present invention can be applied to any data communications network. Multiple affiliate servers 106 are also coupled to network 104. In turn, client computer systems 102 can access the affiliate servers 106 via network 104. Affiliate servers 106 are also referred to as "web servers" generally.

FIG. 1 also illustrates an unauthorized user at a mobile device 108 (e.g., a wireless device such as a portable phone or a PDA) connected to data communications network 104 either directly or via the telephone communications network 105. Most authentication services are designed to interact with humans. However, human interaction with an authentication service can be easily emulated with the use of scripting by an unauthorized user. An authentication server has no reliable way of knowing when it interacts with a human versus a machine. Malicious users, for example, such as the one at the mobile device 108, run scripts against services provided by web servers for a variety of purposes (e.g., registering many new accounts to fictitious users, abusing e-mail services for spam, and the like).

Before executing an authentication process, both the user of client computer system 102 and the operator(s) of affiliate servers 106 "register" with an authentication server 110. The authentication server 110, also coupled to network 104, allows communication between itself and client computer systems 102 and affiliate servers 106. In this example, the unauthorized user, represented by mobile device 108, attempts to run a script to automatically register a large number of accounts with authentication server 110. In general, this registration is a one-time process that provides necessary information to authentication server 110. The user of client computer system 102 registers with authentication server 110 by providing information about the user and/or client computer system 102, such as, the user's name, mailing address, and e-mail address. As part of the user registration process, the user is assigned (or selects) a login ID, which is a common login ID, used to access an affiliate server 106. The login ID may also be referred to herein as a "username," "member name," or "login name."

Additionally, the user selects a password associated with the login ID that is used for authentication purposes. After registering and logging into authentication server 110, the user can visit an affiliate server 106 (i.e., an affiliate server that is also registered with authentication server 110) often without re-entering user credentials and/or other information that is already included in an associated user profile.

As shown in FIG. 1, a memory area such as a database 112 (e.g., an authentication database) is coupled to authentication server 110. The database 112 includes, for example, information (e.g., credentials) necessary to authenticate a user of one of the client computer systems 102 (as well as other users on the network). Although database 112 is shown as a single storage unit separate from authentication server 110, it is to be understood that in other embodiments of the invention, database 112 may be one or more memories included within or separate from authentication server 110. In a federated environment, for example, a plurality of authentication servers such as authentication server 110 may be used to provide authentication.

Although sometimes referred to as a "central server" or "login server" in connection with FIG. 1, authentication server 110 in the illustrated embodiment is also a web server capable of interacting with web browsers and other web servers. In this example, authentication server 110, client computer systems 102, and affiliate servers 106 communicate data among themselves using the hypertext transfer protocol (HTTP), a protocol commonly used on the Internet to exchange information.

Embodiments of the present invention involve the use of challenges (also referred to as "tests"), including confirmation messages, for malicious script prevention in certain areas of operations. A limited amount of confirmation messages are sent to a user of a mobile device to allow the user to register an account via the mobile device. By sending a confirmation message to the mobile device for rendering to the user as a secure challenge, embodiments of the invention deter a malicious script from registering an account using the mobile device. Moreover, by allowing a limited number of confirmation messages to be sent to the mobile device and be challenged by the user, embodiments of the invention prevent brute force registrations of a large number of accounts.

Account Creation via a Mobile Device

FIG. 2 generally illustrates an exemplary process flow of one method (indicated generally by reference character 200) for creating an account via a mobile device according to one embodiment of the invention. The illustrated example of FIG. 2 describes the situation in which a user of a mobile device has not yet logged into an affiliate server and has not yet registered with an authentication server. The lines in FIG. 2 labeled "A" through "O" represent the flow of information or activities during the exemplary process. The arrows on the lines indicate the direction of the exemplary process flow.

At A, the user uses a browser of a mobile device 202 to visit a service (e.g., a web site) provided by an affiliate server 204. In an embodiment of the invention, the mobile device 202 is a wireless device such as a portable (or cellular) phone or a PDA that communicates with an affiliate server, a network server, an authentication server, and/or other devices according to a wireless communications protocol such as WAP. In an alternative embodiment of the invention, mobile device 202 is a device that can be directly reached by a network server 208 using a unique identifier of mobile device 202 (e.g., a device ID and/or a provider ID as discussed hereinafter).

In the example illustrated in FIG. 2, since the user is not registered with an authentication server 206, the affiliate server 204 does not allow the user to access its service via mobile device 202. Instead, affiliate server 204 redirects the browser of mobile device 202 to the network server 208 at B. Along with this redirect, affiliate server 204 passes a sign-in request with sign-in query string parameters to the network server 208.

After receiving the sign-in request from affiliate server 204, network server 208 renders a sign-in user interface (UI) in the browser of mobile device 202 to prompt the user for his or her authentication credentials (e.g., username and/or password) at C. Included in the sign-in UI is a user-selectable option to register an account with the authentication server 206 if the user has not already done so. Since the user in the example of FIG. 2 has not yet registered with authentication server 206, he or she may select the user-selectable option to register an account and send a request for account registration to network server 208 at D. After receiving this request for account registration from mobile device 202, network server 208 renders an identification UI in the browser of mobile device 202 to request a provider ID and a device ID from the user at E.

According to one embodiment of the invention, the provider ID identifies a unique service provider that offers one or more services (e.g., cellular phone services) to the user via mobile device 202. In this embodiment of the invention, the device ID uniquely identifies mobile device 202 and may be a phone number or other identifiers of mobile device 202. A memory area such as a confirmation database 210 associated with network server 208 stores a list of provider IDs that allow their users to register with authentication server 206 via a mobile device. Accordingly, the identification UI rendered in the browser of mobile device 202 includes this list of provider IDs to allow the user to select a particular provider ID associated with mobile device 202. Moreover, the list of provider IDs included in the identification UI may be filtered according to a region where the user is located. Specifically, the sign-in query string passed from affiliate server 204 to network server 208 includes a locale identifier (or locale ID), which identifies the region of the user, and network server 208 will render an identification UI that excludes those provider IDs not providing a service in the identified region. Moreover, network server 208 is configured to render a UI that is localized according to the locale ID included in the sign-in string parameters (e.g., a language used in the UI is based on the identified region of the user). Therefore, the confirmation database 210 also includes data specifying a list of pairings between a specification of the UI (e.g., the language to be used) and a particular locale ID.

In an alternative embodiment of the invention, if the service provided by affiliate server 204 is specific to a particular provider ID, then the identification UI will not request a provider ID from the user. Network server 208 is configured to parse the query string parameters passed from affiliate server 204 to determine if the service of affiliate server 204 is specific to a particular provider ID and to associate this specific provider ID with the user of mobile device 202. At F, the user via mobile device 202 submits a device ID of mobile device 202 and/or a selected provider ID to network server 208.

After network server 208 receives the provider ID and the device ID from the user, it issues a cookie (or other data) written in the domain of network server 208 and stores this cookie on mobile device 202 at G. This cookie is encrypted with the received provider ID and the received device ID and is stored on mobile device 202 for a predefined period (e.g., 24 hours). Moreover, network server 208 will remove this cookie from mobile device 202 after the user has created an account with authentication server 206 via mobile device 202. The purpose of this cookie is to allow network server 208 to determine which mobile device is attempting to create an account during the registration process, particularly in the case where the user restarts the registration process after closing and reopening the browser of mobile device 202.

At H, network server 208 delivers a confirmation message to mobile device 202. According to one embodiment of the invention, the confirmation message may be a secure message such as a SMS message. The SMS message may include a predefined number of numeric digits (e.g., a six-digit numeric SMS message). In an alternative embodiment of the invention, the confirmation message may be in the form of a WAP push message including a link to the confirmation message. However, it is contemplated that other types of messages may be used as the confirmation message.

At I, network server 208 renders a verification UI in the browser of mobile device 202 to request the user to enter the confirmation message delivered to mobile device 202. The verification UI rendered to the user also includes an instruction of how to obtain the delivered confirmation message. Thus, if network server 208 delivered the confirmation message to a memory area of mobile device 202 (e.g., the user's mailbox on mobile device 202), the verification UI will instruct the user to access this memory area to obtain the delivered confirmation message. On the other hand, if network server 208 delivered the confirmation message to the user in the form of a WAP push message including a link to the confirmation message, the verification UI will instruct the user to click on the link to obtain the delivered confirmation message.

At J, the user enters the obtained confirmation message in the verification UI and submits his or her entry to network server 208 via mobile device 202. Accordingly, network server 208 delivers the confirmation message to mobile device 202 for rendering to the user as a secure challenge, and the user submits a response to the rendered challenge by obtaining the delivered confirmation message and submitting the obtained message to network server 208. Furthermore, if network server 208 delivers the confirmation message to mobile device 202 via a secure channel, other mobile devices may not be able to receive this confirmation message and to submit a response because they do not have the unique device ID of mobile device 202. Accordingly, embodiments of the invention prevent automated scripts from receiving a confirmation message and automatically responding to the received confirmation message to register an account.

After network server 208 receives the response to the rendered challenge in the form of the confirmation message from the user, it determines if the received response corresponds to the original confirmation message delivered to mobile device 202. If the received response does not correspond to the originally delivered confirmation message, network server 208 may inquire the user if he or she desires to receive another confirmation message. If the user indicates a desire to receive another confirmation message, then network server 208 delivers a new confirmation message to mobile device 202 for rendering to the user as another challenge. Alternatively, network server 208 may request another response to the originally delivered confirmation message from the user. Moreover, the user may decide to cancel the registration process or restart another registration process from another mobile device having another device ID. But to prevent brute force attack on network server 208, network server 208 imposes a message limit and does not allow more than a predetermined number of confirmation messages (e.g., five confirmation messages) to be sent to a given device ID within a predefined period (e.g., 24 hours). Network server 208 also imposes an attempt limit and does not allow more than a predetermined number of attempts (e.g., five attempts) to enter the correct confirmation message within a predefined period (e.g., 24 hours). Network server 208 will further block a given device ID from registering an account with authentication server 206 if either the message limit or the attempt limit is exceeded.

If network server 208 determines that the user of mobile device 202 has submitted the correct confirmation message (i.e., the received response corresponds to the delivered confirmation message), it renders a registration UI in the browser of mobile device 202 to prompt the user to enter user profile information (e.g., a desired username and/or password) via mobile device 202 at K. Network server 208 may also request an email address or other information from the user via the registration UI. After the user enters the user profile information and selects a user-selectable option to register an account with the entered information, the registration UI provided by network server 208 or scripts that bypass the registration UI then directs the browser of mobile device 202 to authentication server 206 via an HTTP POST interface at L. Accordingly, the user profile information entered by the user (e.g., username, password, email address, etc.), a time stamp indicating a time when the user selects the user-selectable option of the registration UI, and sign-in query string parameters representative of a sign-in request are transmitted to authentication server 206. In addition, blacklist data representative of a requested account is created and transmitted to authentication server 206 at L. The blacklist data is an encrypted field that allows authentication server 206 to avoid creating multiple accounts when the registration UI is redisplayed in the browser of mobile device 202 or when scripts bypass the registration UI to access the HTTP POST interface. In one embodiment of the invention, the blacklist data is a collection of encrypted data, encoded in the following form: Crypt{confirmation_id=hhh&time=ttt}.

In this form of the blacklist data, hhh indicates a 32-bit hash representative of a confirmation identifier (or confirmation ID) combined from the device ID, provider ID, and the correct response to a delivered confirmation message. And ttt indicates a time when the user selects the user-selectable option of the registration UI. Thus, the blacklist data may represent a base-64 encoded string. A memory area such as an authentication database 212 associated with authentication server 206 stores the user-provided information and the created blacklist data. And authentication server 206 will allow a predetermined number of accounts (e.g., one account) to be created for a given confirmation ID specified in blacklist data within a predefined period (e.g., 10 minutes). Accordingly, the user may reattempt account registration if he or she provides unacceptable registration information to authentication server 206 and/or if the HTTP POST fails because of network problems or server unavailability.

After receiving and verifying the user profile information and the blacklist data, authentication server 206 creates an account for the user, sets an authentication server cookie on mobile device 202 (e.g., for future silent authentication), and redirects the browser of mobile device 202 to network server 208 with the sign-in query string parameters at M. If authentication server 206 fails to create an account for the user, it includes an error code in the redirect to allow network server 208 to display an appropriate error message and redisplay the registration UI in the browser of mobile device 202 for the user to re-enter the desired information. If authentication server 206 successfully creates an account for the user, it attaches an encrypted authentication ticket and profile data of the user (e.g., username, email, and/or other user profile information) to the query string of the redirect and passes the encrypted authentication ticket and the profile data to network server 208. The encrypted authentication ticket may include an "access" token, which verifies that the user is who he or she claims to be. After receiving the authentication ticket and the profile data from authentication server 206, network server 208 at N displays a web page in the browser of mobile device 202 to indicate that the user has successfully registered an account with authentication server 206. In addition, network server 208 removes the cookie previously issued in its domain from mobile device 202.

At O, network server 208 searches a service identifier (or service ID) or a site identifier (or site ID) of a service provided by affiliate server 204 against a list of service/site IDs stored in confirmation database 210. If network server 208 detects the service/site ID of the service provided by affiliate server 204 in this list of service/site IDs, it encrypts the device ID of mobile device 202 and/or the user-selected provider ID with the detected service/site ID. Network server 208 at O further appends the encrypted information to a query string that includes the sign-in parameters and redirects the browser of mobile device 202 to affiliate server 204. Therefore, affiliate server 204 receives the provider ID and the device ID of the user and allows the user access to one or more services provided by affiliate server 204. Embodiments of the invention thus allow the user of mobile device 202 to access one or more affiliate services after successfully registering an account with authentication server 206.

Exemplary Method of Creating an Account via a Mobile Device

Figure 3A:
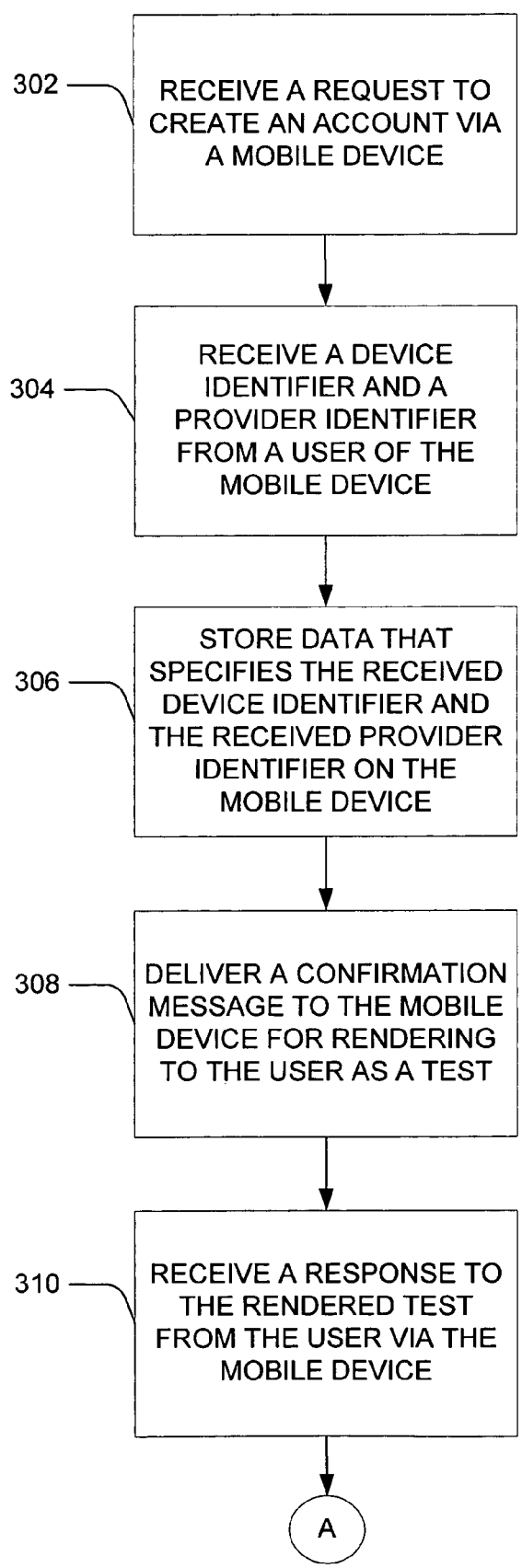
FIGS. 3A and 3B are exemplary flow diagrams illustrating process flow according to one embodiment of the invention for creating an account via a mobile device.
Figure 3B:
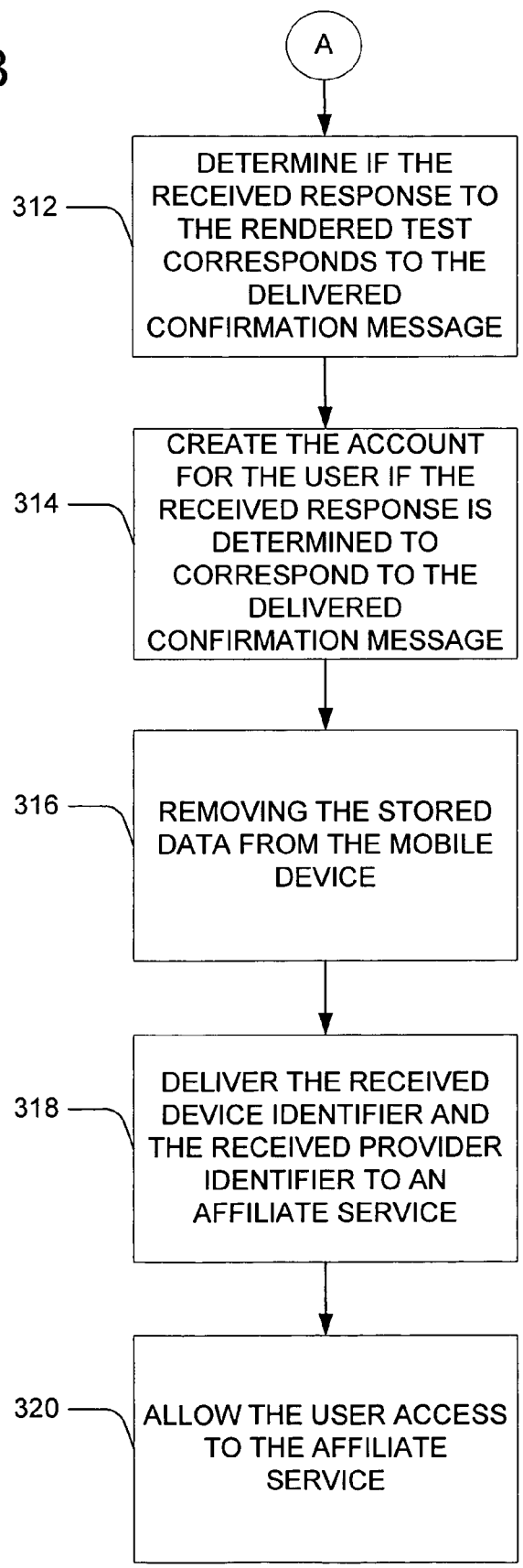

FIGS. 3A and 3B illustrate an exemplary method of creating an account via a mobile device according to one embodiment of the invention. At 302, a request to create an account is received via a mobile device. The request may be received by communicating with the mobile device according to a wireless communications protocol such as WAP, and the mobile device may be a WAP device. Moreover, the request may be received from the mobile device at an affiliate server. This affiliate server provides an affiliate service to a user of the mobile device. At 304, a device ID and a provider ID are received from the user of the mobile device. At 306, data such as a cookie that specifies the received device ID and the received provider ID is stored on the mobile device. This data is stored on the mobile device for a predetermined period (e.g., 24 hours) or until the user successfully registers an account.

At 308, in response to the received request, a confirmation message is delivered to the mobile device for rendering to the user as a challenge. In one embodiment of the invention, the confirmation message is delivered to the mobile device according to a wireless communications protocol such as WAP. Furthermore, the confirmation message may include a WAP push message or a SMS message (e.g., a six-digit numeric SMS code). At 310, a response to the rendered challenge is received from the user via the mobile device.

In addition, one or more of the following data are stored in a memory area such as a confirmation database: the received device ID, the received provider ID, a hash of the received device ID and the received provider ID, the delivered confirmation message, a number of times that a confirmation message is delivered to the mobile device, a number of times that a response to a challenge is received from the user, an indication of whether the received response to the rendered challenge is determined to correspond to the delivered confirmation message, a time stamp indicating a time when the confirmation message is delivered to the mobile device, a combination thereof, and so on. Such stored data are removed from the memory area when the time stamp stored in the memory area is older than a predefined period (e.g., 24 hours).

At 312, it is determined if the received response to the rendered challenge corresponds to the delivered confirmation message. If the received response to the rendered challenge is determined not to correspond to the delivered confirmation message and if the stored number of times that a confirmation message is delivered to the mobile device is less than a predetermined number (e.g., five), the user is asked if he or she desires to receive another confirmation message. If the user indicates such a desire, then another confirmation message is delivered to the mobile device for rendering to the user as another challenge. In response to delivering the other confirmation message to the mobile device, the stored time stamp is updated with a time when the other confirmation message is delivered to the mobile device, the confirmation message stored in the memory area is updated with the other confirmation message delivered to the mobile device, the stored number of times that a confirmation message is delivered to the mobile device is incremented, and the stored number of times that a response to a challenge is received is set to zero.

Alternatively, if the received response to the rendered challenge is determined not to correspond to the delivered confirmation message and if the stored number of times that a response to a challenge is received from the user is less than a predetermined number (e.g., five), then another response to the rendered challenge is prompted from the user. In this case, the other response to the rendered challenge is received from the user via the mobile device, and it is determined if the other response to the rendered challenge corresponds to the delivered confirmation message.

At 314, the account for the user is created if the most recently received response to a rendered challenge is determined to correspond to the most recently delivered confirmation message. In one embodiment, the account for the user may be created at an authentication server associated with the affiliate server that receives the request to create the account.

Moreover, data representative of the created account is stored in a memory area such as an authentication database. Such data may include one or more of the following: the received device ID, the received provider ID, the correct response to the rendered challenge, a time when the account is created, a combination thereof, and so on. And the received device ID, the received provider ID, and the correct response to the rendered challenge may be stored in the memory area as a hash.

At 316, data such as a cookie previously stored on the mobile device is removed from the mobile device. At 318, the received device ID and the received provider ID are delivered to an affiliate service. At 320, the user is allowed access to the affiliate service in response to creating the account for the user.

Exemplary Database Schema

Figure 4:
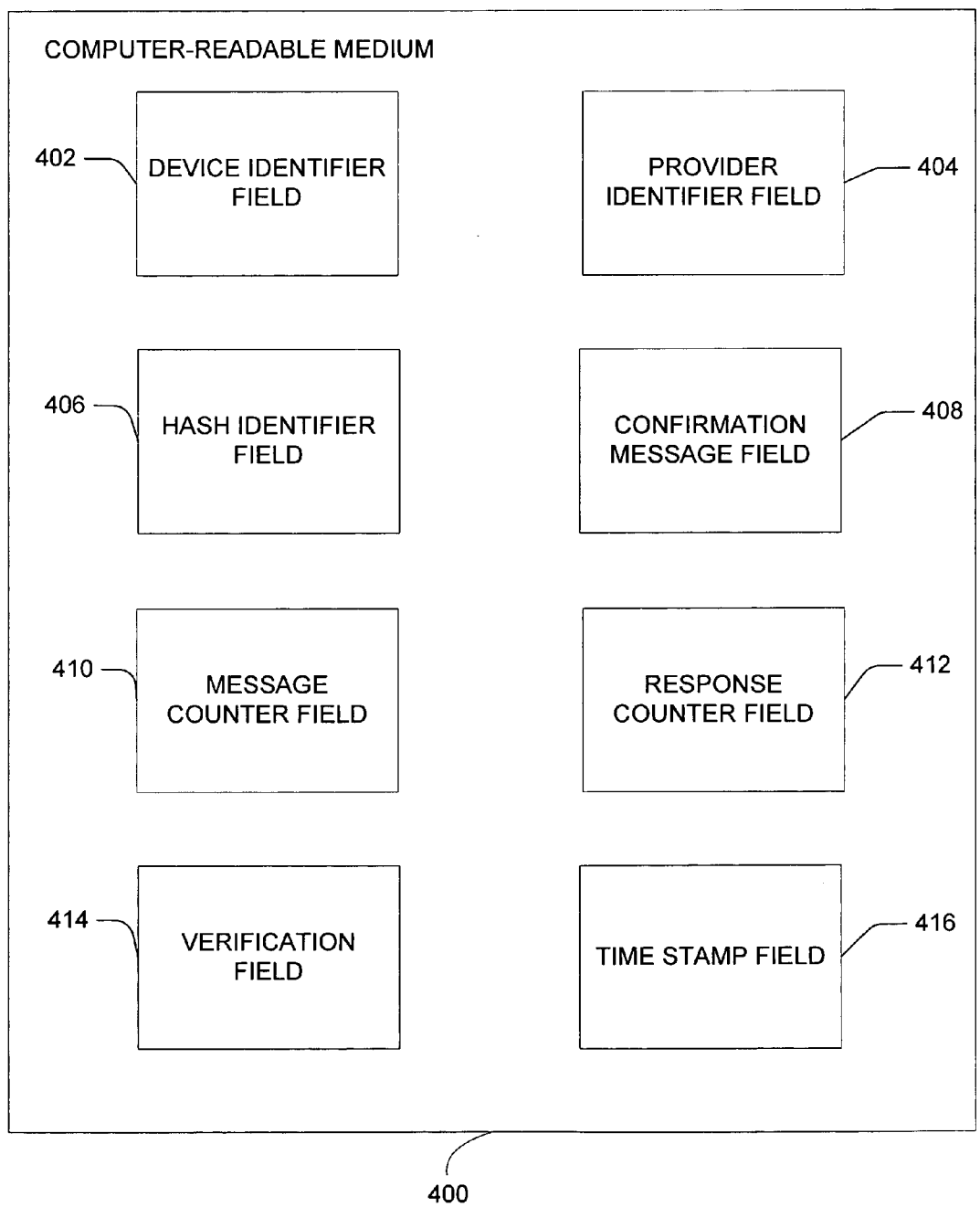
FIG. 4 is a block diagram illustrating an exemplary data structure according to one embodiment of the invention for creating an account via a mobile device.

In FIG. 4, an exemplary computer-readable medium 400 according to one embodiment of the invention stores thereon a data structure for creating an account via a mobile device. In one embodiment, the data structure represents an exemplary database schema of a confirmation database such as confirmation database 210. It is contemplated that computer-readable medium 400 may be any quantity of computer-readable media and may comprise various combinations of data structures and functionalities associated with each structure.

According to one embodiment of the invention, the data structure of computer-readable medium 400 includes a plurality of fields, including a device ID field 402. The device ID field 402 is configured to store a device ID, which identifies a mobile device of a user. Specifically, device ID field 402 stores a device ID of a mobile device to which a confirmation message is delivered (e.g., via a secure channel). The data structure also includes a provider ID field 404 configured to store a provider ID identifying a service provider that offers a service to the user via the mobile device. Moreover, a hash identifier (or hash ID) field 406 of the data structure is configured to store a 32-bit hash of the device ID and the provider ID. The 32-bit hash may be used to partition the database.

As illustrated in FIG. 4, the data structure of computer-readable medium 400 also includes a confirmation message field 408 for storing the most recent confirmation message delivered to the mobile device for rendering to the user as a challenge. A message counter field 410 is configured to store a number of times that a confirmation message is generated and delivered to the mobile device. And a response counter field 412 is configured to store a number of times that the user has attempted to create an account by sending a response to a rendered challenge. The data structure also includes a verification field 414 for storing an indication of whether a received response to a rendered challenge corresponds to the most recently delivered confirmation message and a time stamp field 416 for storing a time when the most recent confirmation message is generated and delivered to the mobile device.

Associated with the database schema represented by the data structure are two exemplary procedures. Specifically, a CreateNewConfirmationMessage procedure is called when a new confirmation message is generated and delivered to a mobile device. The input to the CreateNewConfirmationMessage procedure includes a device ID, a provider ID, a hash representative of the device ID and the provider ID, and a confirmation message. If the input device ID and provider ID do not already exist in the confirmation database, then the procedure creates a new entry in the database with the input device ID and provider ID. Additionally, the message counter field 410 is set to 1, the response counter field 412 is set to 0, the verification field 414 is set to false, and the timestamp field 416 is set to a time when the confirmation message is delivered to the mobile device (e.g., in universal time coordinate (UTC)).

If data entry corresponding to the input device ID and provider ID already exists in the confirmation database, and the number stored in message counter field 410 is greater than a predetermined number (e.g., five), then the CreateNewConfirmationMessage procedure throws an error code. But if the number stored in message counter field 410 is not greater than the predetermined number, then the procedure updates the confirmation message field 408 with the input confirmation message. Furthermore, the CreateNewConfirmationMessage procedure updates time stamp field 416 with a time when the input confirmation message is generated and delivered to the mobile device, increments the number stored in message counter field 410 by one, and sets the number stored in response counter field 410 to zero.

Further associated with the database schema is a VerifyConfirmationMessage procedure called when a user submits a response to a delivered confirmation message. The input to the VerifyConfirmationMessage procedure includes a device ID, a provider ID, and the response submitted by the user. The output of the procedure indicates if the submitted response is successfully verified of if the user has exceeded a retry limit. Thus, in response to a received response to a delivered confirmation message, if the number stored in response counter field 412 is greater than a predetermined number (e.g., five), then the VerifyConfirmationMessage procedure returns Success=false and RetriesExceeded=true. If verification field 414 indicates that the user has already registered an account using the input device ID and provider ID, then the VerifyConfirmationMessage procedure returns Success=false and RetriesExceeded=false.

On the other hand, if the number stored in response counter field 412 is not greater than the predetermined number, then the VerifyConfirmationMessage procedure increments the number stored in response counter field 412 by one. Moreover, if the received response corresponds to the most recently delivered confirmation and if the number stored in response counter field 412 is not greater than the predetermined number after the increment, then the VerifyConfirmationMessage procedure returns Success=true and RetriesExceeded=false. In this case, the procedure further sets verification field 414 to indicate that a received response to a rendered challenge corresponds to the most recently delivered confirmation message and that the user has successfully registered an account. But if the received response does not correspond to the most recently delivered confirmation message, the VerifyConfirmationMessage procedure returns Success=false. And if the number stored in response counter field 412 is greater than the predetermined number after the increment, the VerifyConfirmationMessage procedure returns RetriesExceeded=true. In such cases, the procedure sets verification field 414 to indicate that the user has not successfully registered an account.

In an embodiment of the invention, a cleanup process will remove data entries in the confirmation database that has a time stored in time stamp field 416 older than a predefined period (e.g., 24 hours).

Exemplary Computer-Readable Medium

Figure 5:
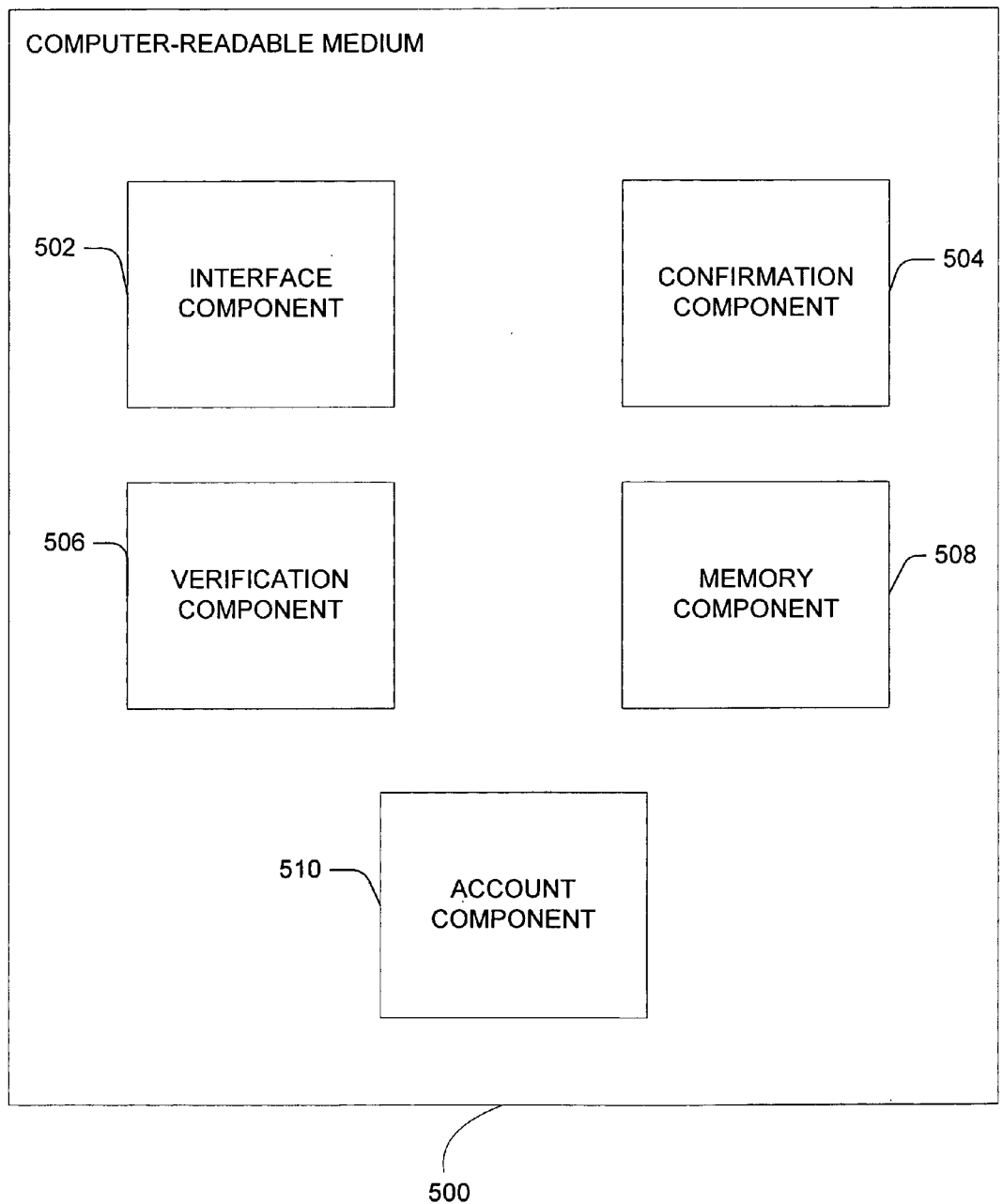
FIG. 5 is a block diagram illustrating an exemplary computer-readable medium according to one embodiment of the invention.

FIG. 5 is a block diagram illustrating an exemplary computer-readable medium 500 according to one embodiment of the invention. As shown, the computer-readable medium 500 includes an interface component 502, a confirmation component 504, a verification component 506, a memory component 508, and an account component 510. However, it is contemplated that computer-readable medium 500 may be any quantity of computer readable media and may comprise various combinations of components and functionalities associated with each component.

The interface component 502 receives a request to create an account from a user. The user requests to create the account via a mobile device, and this request may be received from the mobile device via a wireless communications protocol such as WAP. Interface component 502 also receives a device ID and a provider ID from the user via the mobile device. The confirmation component 504 transmits a confirmation message such as a SMS message or a WAP push message to the mobile device in response to the received request. The confirmation message may be a six-digit numeric code and is transmitted to the mobile device for rendering to the user as a challenge. The verification component 506 receives a response to the rendered challenge from the user via the mobile device and determines if the received response to the rendered challenge corresponds to the transmitted confirmation message. The memory component 508 stores one or more of the following data: the received device ID, the received provider ID, a hash of the received device ID and the received provider ID, the transmitted confirmation message, a number of times that a confirmation message is transmitted to the mobile device, a number of times that a response to a challenge is received from the user, an indication of whether the received response to the rendered challenge is determined to correspond to the transmitted confirmation message, and a time stamp indicating a time when the confirmation message is transmitted to the mobile device, a combination thereof, and so on.

If verification component 506 determines that the received response to the rendered challenge does not correspond to the transmitted confirmation message and if the stored number of times that a confirmation message is transmitted to the mobile device is less than a predetermined number (e.g., five) within a predefined period (e.g., 24 hours), then interface component 502 is configured to inquire if the user desires to receive another confirmation message. If interface component 502 gets an indication from the user specifying that he or she desires to receive another confirmation message, then confirmation component 504 is configured to transmit a new confirmation message to the mobile device. Moreover, if the stored number of times that a response to a challenge is received from the user is less than a predetermined number (e.g., five) within a predefined period (e.g., 24 hours), interface component 502 is configured to prompt another response to the rendered challenge from the user.

If verification component 506 determines that a received response to a rendered challenge corresponds to a transmitted confirmation message, then the account component 510 creates an account for the user. Account component 510 is also configured to transmit the received device ID and the received provider ID to an affiliate service in response to creating the account for the user to allow the user access to the affiliated service.

Exemplary Operating Environment

Figure 6:
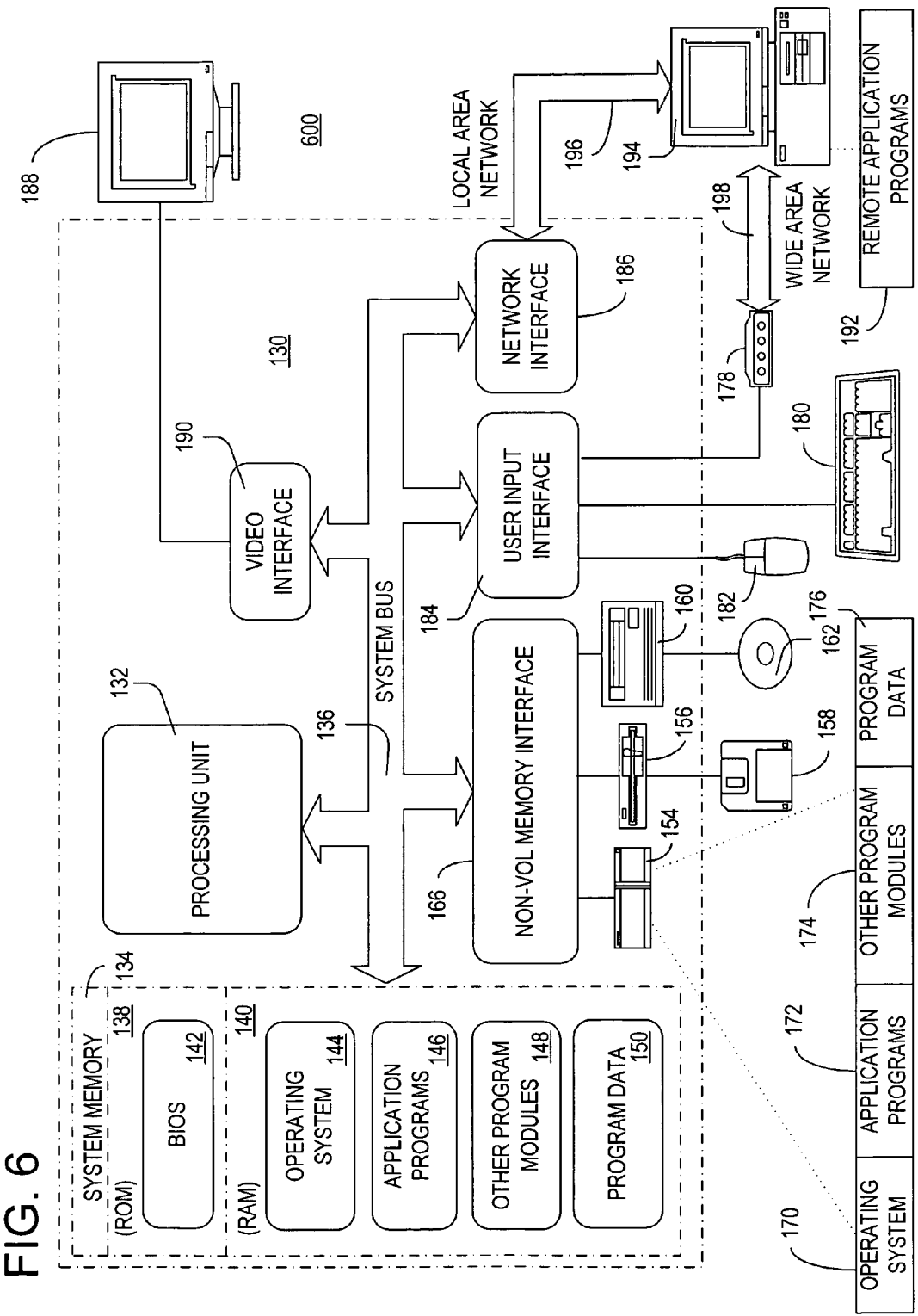
FIG. 6 is a block diagram illustrating an exemplary embodiment of a suitable computing system environment in which one embodiment of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to create an account via a mobile device. Computer-executable instructions are configured to receive, via a mobile device, a request from a user to create an account. The request is received from the mobile device according to a wireless communications protocol. Computer-executable instructions are also configured to deliver, in response to the received request, a confirmation message to the mobile device for rendering to the user as a challenge. Computer executable instructions are further configured to receive a response to the rendered challenge from the user via the mobile device and to determine if the received response to the rendered challenge corresponds to the delivered confirmation message. Computer-executable instructions are configured to create the account for the user if the received response to the rendered challenge is determined to correspond to the delivered confirmation message.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of creating a web service account via a mobile device to avoid automated scripts from registering a large number of accounts, said method comprising:
   receiving, via a mobile device, a request to create the web service account, said request being received from the mobile device according to a wireless communications protocol, said web service account enabling one or more services provided by the web service;
   delivering, in response to the received request, a challenge for rendering on the mobile device to a human user, said challenging comprising a short messaging service (SMS) message or a link within a Wireless Application Protocol (WAP) push message to the mobile device, said link directing the user to obtain the rendered challenge, said rendered challenge including a confirmation message chosen by the web service to confirm that the received request was from the user via the mobile device;
   delivering a verification user interface (UI) to be rendered on the mobile device requesting an entry of the confirmation message from the user;
   receiving a response, including the confirmation message, to the rendered challenge from the user via the mobile device, said received response indicating that the received response was from the human user and not from automated scripts;
   determining if the received response to the rendered challenge corresponds to the delivered confirmation message;
   delivering a registration UI to be rendered on the mobile device requesting entries from the user if the received response to the rendered challenge is determined to correspond to the delivered confirmation message, said entries including at least the following: user profile information, a username for the user, a password for the user, and an e-mail address for the user; and
   in response to receiving the user information from the user, creating the web service account for the user if the user is not on a blacklist of successful responses, thereafter generating blacklist data representing the requested web service account that is being created and updating the blacklist of successful responses with the generated blacklist data, said blacklist data including an encrypted field for use in identifying the mobile device requesting the web service account to avoid multiple web service accounts being created by the mobile device when the registration UI is redisplayed on the mobile device, said encrypted field representing a confirmation identifier combined from a device identifier associated with the mobile device, a provider identifier associated with a wireless service provider of the mobile device, and the correct confirmation message to the rendered challenge.

2. The method of claim 1, wherein receiving the request comprises communicating with the mobile device according to a Wireless Application Protocol (WAP).

3. The method of claim 1, wherein delivering the confirmation message comprises delivering the confirmation message to the mobile device according to a wireless communications protocol.

4. The method of claim 1, wherein the confirmation message comprises a six-digit numeric code.

5. The method of claim 1, further comprising allowing the user access to an affiliate service in response to creating the web service account for the user, and wherein creating the web service account for the user comprises receiving user profile information from the user via the mobile device and creating the web service account for the user in response to the received user profile information.

6. The method of claim 1, further comprising:
   receiving a device identifier and a provider identifier from the user via the mobile device, said device identifier identifying the mobile device, said provider identifier identifying a service provider that offers a service to the user via the mobile device; and
   storing data on the mobile device, said data specifying the received device identifier and the received provider identifier, said data being stored on the mobile device for a predetermined period.

7. The method of claim 6, further comprising removing the stored data from the mobile device if the received response to the rendered challenge is determined to correspond to the delivered confirmation message.

8. The method of claim 1, further comprising receiving a device identifier and a provider identifier from the user via the mobile device, said device identifier identifying the mobile device, said provider identifier identifying a service provider that offers a service to the user via the mobile device, and wherein creating the web service account for the user comprises storing data representative of the created web service account in a memory area, said data comprising one or more of the following: the received device identifier, the received provider identifier, the received response to the rendered challenge, and a time when the web service account is created.

9. The method of claim 8, wherein storing the data representative of the created web service account in the memory area further comprises storing the received device identifier, the received provider identifier, and the received response to the rendered challenge in the memory area as a hash.

10. The method of claim 1, further comprising:
    receiving a device identifier and a provider identifier from the user via the mobile device, said device identifier identifying the mobile device, said provider identifier identifying a service provider that offers a service to the user via the mobile device; and
    storing one or more of the following data in a memory area: the received device identifier, the received provider identifier, a hash of the received device identifier and the received provider identifier, the delivered confirmation message, a number of times that a confirmation message is delivered to the mobile device, a number of times that a response to a challenge is received from the user, an indication of whether the received response to the rendered challenge is determined to correspond to the delivered confirmation message, and a time stamp indicating a time when the confirmation message is delivered to the mobile device.

11. The method of claim 10, further comprising removing the data stored in the memory area when the time stamp stored in the memory area is older than a predefined period.

12. The method of claim 10, further comprising:
inquiring if the user desires to receive another confirmation message when the received response to the rendered challenge is determined not to correspond to the delivered confirmation message and when the stored number of times that a confirmation message is delivered to the mobile device is less than a predetermined number;
receiving an indication from the user via the mobile device, said indication specifying a desire of the user to receive the other confirmation message; and
delivering the other confirmation message to the mobile device for rendering to the user as another challenge.

13. The method of claim 12, further comprising performing one or more of the following in response to delivering the other confirmation message to the mobile device: updating the stored time stamp with a time when the other confirmation message is delivered to the mobile device, updating the confirmation message stored in the memory area with the other confirmation message delivered to the mobile device, incrementing the stored number of times that a confirmation message is delivered to the mobile device, and setting the stored number of times that a response to a challenge is received to zero.

14. The method of claim 1, further comprising:
storing data in a memory area, said data indicating a number of times that a response to a challenge is received from the user;
prompting another response to the rendered challenge from the user if the received response to the rendered challenge is determined not to correspond to the delivered confirmation message and if the indicated number of times that a response to a challenge is received from the user is less than a predetermined number within a predefined period; receiving the other response to the rendered challenge from the user via the mobile device;
determining if the other response to the rendered challenge corresponds to the delivered confirmation message; and
creating the web service account for the user if the other response to the rendered challenge is determined to correspond to the delivered confirmation message.

15. The method of claim 1, further comprising: receiving a device identifier and a provider identifier from the user via the mobile device, said device identifier identifying the mobile device, said provider identifier identifying a service provider that offers a service to the user via the mobile device; and
delivering the received device identifier and the received provider identifier to an affiliate service in response to creating the web service account for the user.

16. The method of claim 1, wherein receiving the request comprises receiving the request from the user at an affiliate server, said affiliate server associated with an authentication server and providing an affiliate service to the user; and wherein creating the web service account comprises creating the web service account for the user at the authentication server.

17. The method of claim 1, wherein one or more computer-readable media have computer-executable instructions for performing the method recited in claim 1.

18. The method of claim 1, wherein in response to receiving the user information from the user via the mobile device:
detecting the encrypted field on the mobile device; and
preventing the web service account for the user from being created based upon the blacklist data of the blacklist of successful responses and the detected encrypted field.

19. A system for creating a web service account via a mobile device to avoid automated scripts from registering a large number of web service accounts, said system comprising:
a network server for receiving a request to create the web service account via a mobile device, said request being received from the mobile device according to a wireless communications protocol, said web service account enabling one or more services provided by the web service, said network server being configured to deliver a challenge for rendering on the mobile device to a human user, said challenging comprising a short messaging service (SMS) message or a link within a Wireless Application Protocol (WAP) push message to the mobile device in response to receiving the request, said link directing the user to obtain a the rendered challenge, said rendered challenge including a confirmation message chosen by the web service to confirm that the received request was from the user via the mobile device;
said network server being further configured to deliver a verification user interface (UI) to be rendered on the mobile device requesting an entry of the confirmation message from the user, said network server being configured to receive a response, including the confirmation message, to the rendered challenge from the user via the mobile device and to determine if the received response to the rendered challenge corresponds to the delivered confirmation message, said received response indicating that the received response was from the human user and not from the automated scripts, said network server further delivering a registration UI to be rendered on the mobile device requesting entries from the user if the network server determines that the received response to the rendered challenge corresponds to the delivered confirmation message, said entries including at least the following: user profile information, a username for the user, a password for the user, and an e-mail address for the user; and
an authentication server for creating the web service account for the user, in response to the entries received from the user, if the user is not on a blacklist of successful responses, thereafter generating blacklist data representing the requested web service account that is being created and updating the blacklist of successful responses with the generated blacklist data, said blacklist data including an encrypted field for use in identifying the mobile device requesting the web service account to avoid multiple web service accounts being created by the mobile device when the registration UI is redisplayed on the mobile device, said encrypted field representing a confirmation identifier combined from a device identifier associated with the mobile device, a provider identifier associated with a wireless service provider of the mobile device, and the correct confirmation message to the rendered challenge.

20. The system of claim 19, wherein the network server is configured to deliver the confirmation message to the mobile device according to a wireless communications protocol.

21. The system of claim 19, further comprising an affiliate server associated with the network server and the authentication server, said affiliate server is configured to initially receive the request from the user via the mobile device and to communicate the request to the network server via a data communications network.

22. The system of claim 19, wherein the network server is configured to receive a device identifier and a provider identifier from the user via the mobile device, said device identifier identifying the mobile device, said provider identifier identifying a service provider that offers a service to the user via the mobile device, said network server further configured to deliver the received device identifier and the received provider identifier to the authentication server.

23. The system of claim 22, further comprising an affiliate server associated with the network server and the authentication server, wherein the authentication server is configured to receive user profile information from the user via the mobile device and to create the web service account for the user in response to the received user profile information, said authentication server further configured to deliver the received device identifier and the received provider identifier to the affiliate server and to allow the user access to an affiliate service provided by the affiliate server in response to creating the web service account for the user.

24. The system of claim 22, further comprising an authentication database associated with the authentication server, said authentication database configured to store data representative of the web service account created by the authentication server, said data comprising one or more of the following: the received device identifier, the received provider identifier, the received response to the rendered challenge, and a time when the web service account is created by the authentication server.

25. The system of claim 22, further comprising a confirmation database associated with the network server, said confirmation database configured to store one or more of the following data: the received device identifier, the received provider identifier, a hash of the received device identifier and the received provider identifier, the delivered confirmation message, a number of times that a confirmation message is delivered to the mobile device, a number of times that a response to a challenge is received from the user, an indication of whether the received response to the rendered challenge is determined to correspond to the delivered confirmation message, and a time stamp indicating a time when the confirmation message is delivered to the mobile device.

26. The system of claim 25, wherein the network server is configured to remove the data stored in the confirmation database when the time stamp stored in the confirmation database is older than a predefined period.

27. The system of claim 25, wherein the network server is configured to prompt another response to the rendered challenge from the user if the network server determines that the received response to the rendered challenge does not correspond to the delivered confirmation message and if the stored number of times that a response to a challenge is received from the user is less than a predetermined number.

28. The system of claim 25, wherein the network server is configured to inquire if the user desires to receive another confirmation message when the network server determines that the received response to the rendered challenge does not correspond to the delivered confirmation message and when the stored number of times that a confirmation message is delivered to the mobile device is less than a predetermined number, said network server further configured to deliver the other confirmation message to the mobile device for rendering to the user as another challenge if the network server receives an indication from the user specifying that the user desires to receive the other confirmation message.

29. The system of claim 28, wherein the network server is configured to access the confirmation database and to perform one or more of the following in response to delivering the other confirmation message to the mobile device: updating the stored time stamp with a time when the other confirmation message is delivered to the mobile device, updating the confirmation message stored in the confirmation database with the other confirmation message delivered to the mobile device, incrementing the stored number of times that a confirmation message is delivered to the mobile device, and setting the stored number of times that a response to a challenge is received to zero.

30. The system of claim 19, wherein the authentication server further comprises:
    detecting the encrypted field on the mobile device; and
    preventing the web service account for the user from being created based upon the blacklist data of the blacklist of successful responses and the detected encrypted field.

31. One or more computer-readable media having stored thereon a data structure for creating a web service account via a mobile device to avoid automated scripts from registering a large number of web service accounts, said data structure comprising:
    a device identifier field for storing a device identifier, said device identifier identifying a mobile device of a user;
    a provider identifier field for storing a provider identifier, said provider identifier identifying a service provider that offers a service to the user via the mobile device;
    a confirmation message field for storing a challenge comprising a short message service (SMS) message or a link, said challenge including a confirmation message, said confirmation message being chosen by the web service to confirm that the received request was from the user via the mobile device;
    a message counter field for storing a number of times that the stored confirmation message included in the challenge is delivered to the mobile device; and
    a response counter field for storing a number of times that a response to the rendered challenge is received from the user,
    wherein at least the device identifier in the device identifier field, the provider identifier in the provider identifier field, the number stored in the message counter field and the number stored in the response counter field are transmitted to the web service to form an encrypted blacklist of successful responses such that the web service uses the blacklist of successful responses to determine whether to create a new web service account for using the web service for the user.

32. The computer-readable media of claim 31, wherein the data structure further comprises:
    a hash identification field for storing a hash of the stored device identifier and the stored provider identifier,
    a verification field for storing an indication of whether the received response to the rendered challenge corresponds to the delivered confirmation message, and
    a time stamp field for storing a time when the stored confirmation message is delivered to the mobile device.

33. The computer-readable media of claim 32, wherein if the indication stored in the verification field specifies that the received response to the rendered challenge does not correspond to the delivered confirmation message and if the number of times stored in the message counter field is less than a predetermined number, the confirmation message field is updated with another confirmation message, the number of times stored in the message counter field is incremented, the number of times stored in the response counter field is set to zero, and the time stamp field is updated with a time when the other confirmation message is delivered to the mobile device for rendering to the user as another challenge.

34. The computer-readable media of claim 31, wherein the confirmation message stored in the confirmation message field comprises a six-digit numeric code.

35. One or more computer-readable media having computer-executable components for creating a web service account via a mobile device, said computer-readable media comprising:

an interface component to receive a request to create the web service account, said user requesting to create the web service account via a mobile device, said request being received from the mobile device according to a wireless communications protocol;

a confirmation component to transmit a challenge for rendering on the mobile device to a human user, said challenging comprising a short messaging service (SMS) message or a link within a Wireless Application Protocol (WAP) push message to the mobile device in response to the received request, said link directing the user to obtain the rendered challenge, said rendered challenge including a confirmation message chosen by the web service to confirm that the received request was from the user via the mobile device;

a verification component to deliver a verification user interface (UI) to be rendered on the mobile device requesting an entry of the confirmation message from the user, said verification component is configured to receive a response including the confirmation message to the rendered challenge from the user via the mobile device and to determine if the received response to the rendered challenge corresponds to the transmitted confirmation message, said verification component further delivering a registration UI to be rendered on the mobile device requesting entries from the user if the received response to the rendered challenge is determined to correspond to the delivered confirmation message, said entries including at least the following: user profile information, a username for the user, a password for the user, and an e-mail address for the user, said received response indicating that the received response was from the human user and not from the automated scripts; and an account component to create the web service account for the user if the user is not on a blacklist of successful responses, in response to the received entries from the user, thereafter generating blacklist data representing a requested web service account that is being created and updating the blacklist of successful responses with the generated blacklist data, said blacklist data including an encrypted field for use in identifying the mobile device requesting the web service account to avoid multiple web service accounts being created by the mobile device when the registration UI is redisplayed on the mobile device, said encrypted field representing a confirmation identifier combined from a device identifier associated with the mobile device, a provider identifier associated with a wireless service provider of the mobile device, and the correct confirmation message to the rendered challenge.

36. The computer-readable media of claim 35, wherein the interface component is configured to receive a device identifier and a provider identifier from the user via the mobile device, said device identifier identifying the mobile device, said provider identifier identifying a service provider that offers a service to the user via the mobile service, and wherein the account component is configured to receive user profile information from the user via the mobile device and to create the web service account for the user in response to the received user profile information, said account component further configured to transmit the received device identifier and the received provider identifier to an affiliate service in response to creating the web service account for the user.

37. The computer-readable media of claim 36, further comprising a memory component to store one or more of the following data: the received device identifier, the received provider identifier, a hash of the received device identifier and the received provider identifier, the transmitted confirmation message, a number of times that a confirmation message is transmitted to the mobile device, a number of times that a response to a challenge is received from the user, an indication of whether the received response to the rendered challenge is determined to correspond to the transmitted confirmation message, and a time stamp indicating a time when the confirmation message is transmitted to the mobile device.

38. The computer-readable media of claim 37, wherein the interface component is configured to inquire if the user desires to receive another confirmation message when the verification component determines that the received response to the rendered challenge does not correspond to the delivered confirmation message and when the stored number of times that a confirmation message is transmitted to the mobile device is less than a predetermined number within a predefined period, and wherein the confirmation component is configured to transmit the other confirmation message to the mobile device for rendering to the user as another challenge if the interface component receives an indication from the user specifying that the user desires to receive the other confirmation message.

39. The computer-readable media of claim 37, wherein the interface component is configured to prompt another response to the rendered challenge from the user if the verification component determines that the received response to the rendered challenge does not correspond to the transmitted confirmation message and if the stored number of times that a response to a challenge is received from the user is less than a predetermined number within a predefined period.

40. The computer-readable media of claim 35, wherein the account component can further detect the encrypted field on the mobile device and prevent the web service account for the user from being created based upon the blacklist data of the blacklist of successful responses and the detected encrypted field.

* * * * *

UNITED STATES PATENT AND TRADEMARK OFFICE
CERTIFICATE OF CORRECTION

PATENT NO. : 7,606,918 B2  Page 1 of 1
APPLICATION NO. : 10/850010
DATED : October 20, 2009
INVENTOR(S) : Holzman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this

Twelfth Day of October, 2010

David J. Kappos
*Director of the United States Patent and Trademark Office*